United States Patent
Ramer et al.

(10) Patent No.: US 10,591,355 B2
(45) Date of Patent: *Mar. 17, 2020

(54) LIGHTING DEVICE INCORPORATING A HYPERSPECTRAL IMAGER AS A RECONFIGURABLE SENSING ELEMENT

(71) Applicant: ABL IP HOLDING LLC, Conyers, GA (US)

(72) Inventors: David P. Ramer, Reston, VA (US); Jack C. Rains, Jr., Herndon, VA (US)

(73) Assignee: ABL IP HOLDING LLC, Conyers, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/287,306

(22) Filed: Feb. 27, 2019

(65) Prior Publication Data

US 2019/0234797 A1    Aug. 1, 2019

Related U.S. Application Data

(63) Continuation of application No. 15/369,276, filed on Dec. 5, 2016, now Pat. No. 10,365,157.

(51) Int. Cl.
*G01J 3/28* (2006.01)
*G01J 3/02* (2006.01)
(Continued)

(52) U.S. Cl.
CPC .......... *G01J 3/0275* (2013.01); *G01J 1/4204* (2013.01); *G01J 3/027* (2013.01); *G01J 3/2823* (2013.01);
(Continued)

(58) Field of Classification Search
CPC ........ G01J 3/0275; G01J 1/4204; G01J 3/027; G01J 2003/2826; G01J 2003/2833;
(Continued)

(56) References Cited

U.S. PATENT DOCUMENTS 4,893,894 A    1/1990 Caimi
5,050,992 A    9/1991 Drummond et al.
(Continued)

OTHER PUBLICATIONS

Notice of Allowance for U.S. Appl. No. 15/247,076, dated Dec. 31, 2018, 13 pages.
(Continued)

*Primary Examiner* — Abdullahi Nur
(74) *Attorney, Agent, or Firm* — RatnerPrestia

(57) ABSTRACT

Disclosed are examples of hyperspectral imager-equipped lighting devices that provide general illumination supplied by artificial or natural light, and that also detect environmental conditions in the environment around the lighting device. The hyperspectral imager detects light within a contiguous spectral band from the environment in the vicinity of the lighting device. In response, the hyperspectral imager generates image data representative of the spectral intensity of one or more subsets of a continuous spectrum of wavelengths of the detected light. A controller may analyze the image data generated by the hyperspectral imager and may initiate action to control operation of the light source or building management products based on an environmental condition detected by the analysis of the generated image data.

28 Claims, 7 Drawing Sheets

(51) Int. Cl.
*H05B 37/02* (2006.01)
*G01J 1/42* (2006.01)
*G06T 7/514* (2017.01)
*H04N 5/33* (2006.01)
*F21S 8/02* (2006.01)
*G08B 15/00* (2006.01)
*G08B 17/00* (2006.01)
*F21V 33/00* (2006.01)

(52) U.S. Cl.
CPC ............. *G06T 7/514* (2017.01); *H04N 5/332* (2013.01); *H05B 37/0218* (2013.01); *H05B 37/0272* (2013.01); *F21S 8/026* (2013.01); *F21V 33/00* (2013.01); *G01J 2003/2826* (2013.01); *G01J 2003/2833* (2013.01); *G06T 2207/10028* (2013.01); *G08B 15/001* (2013.01); *G08B 17/00* (2013.01)

(58) Field of Classification Search
CPC ............ H05B 37/0272; H05B 37/0218; G08B 17/00; G08B 15/001; F21S 8/026; F21V 33/00

See application file for complete search history.

(56) References Cited

U.S. PATENT DOCUMENTS

| | | | |
|---|---|---|---|
| 6,560,546 | B1 | 5/2003 | Shenk et al. |
| 8,592,768 | B1 | 11/2013 | Djeu |
| 9,392,753 | B2 * | 7/2016 | Krijn ................ A01G 7/045 |
| 9,451,668 | B2 | 9/2016 | Bewick et al. |
| 2002/0138210 | A1 | 9/2002 | Wilkes et al. |
| 2003/0109055 | A1 | 6/2003 | Lehmann et al. |
| 2006/0232779 | A1 | 10/2006 | Shaw |
| 2007/0045524 | A1 | 3/2007 | Rains |
| 2009/0122317 | A1 | 5/2009 | Ito et al. |
| 2009/0195776 | A1 | 8/2009 | Durst et al. |
| 2009/0267540 | A1 | 10/2009 | Chemel et al. |
| 2010/0114514 | A1 | 5/2010 | Wang et al. |
| 2011/0251800 | A1 | 10/2011 | Wilkins |
| 2013/0293877 | A1 | 11/2013 | Ramer |
| 2013/0307419 | A1 | 11/2013 | Simonian et al. |
| 2015/0271380 | A1 * | 9/2015 | Darty ................... G01J 3/0294 348/342 |

OTHER PUBLICATIONS

Non Final Office Action for U.S. Appl. No. 15/247,076, dated Jun. 28, 2018, 24 pages.
Antoszewski et al., "Tunable Fabry-Perot filters operating in the 3 to 5 um range for infrared micro-spectrometer applications", Proc. of SPIE, 2, 2006, vol. 6186, 9 pages.
Chen et al., "Miniature Bio-chemical Analytical System Based on Microspectrometer", PRoceedings of SPIE, 2005, vol. 5719, pp. 95-101.
Chen et al., "Integrated diffraction grating for lab-on-a-chip microspectrometers", PRoc of SPIE, 2205, vol. 5699, pp. 511-516.
Crocombe et al., "Micro-optical instrumentation for process spectroscopy", Porceedings of SPIE, 2005, vol. 5591, pp. 11-25.
Keating et al., "Fabry-Pérot MEMS microspectrometers spanning the SWIR and MWIR", Proceedings of SPIE, 2007, vol. 6542, 8 pages.
Keating et al., "Optical Characerization of Fabry-Pérot MEMS Filters Integrated on Tunable Short-Wave IR Detectors", IEEE Photonics Technology Letters, May 1, 2006, vol. 18, No. 9, pp. 10749-1081.
Krippner et al., "Electromagnetically Driven Microchopper for Integration into Microspectrometers Based on the LIGA Technology", SPIE Conference on Minaturized Systems with Micro-Optics and MEMO, Sep. 1999, vol. 3878, pp. 144-154.
Rlvas et al., "Tunable Single Pixel MEMS Fabry-Perot Interferometer", Optical Society of America, 3 pages. 2011.
Misra et al., "Chlorophyll Fluorescence in Plant Biology", Biophysics, Dr. Prof. Dr. A.an. Misra (ed), InTech, http://www.intechopen.com/books/biophysics/chlorophyll-fluorescence-in-plant-biology, accecssed from the Internet Nov. 29, 2016.
"Plant Stress Management", https://en.wikipedia.org/wiki/Plant_stress_management, accessed on the Internet Nov. 29, 2016.
"Chlorophyll Fluorescence", https://en.wikipedia.org/wiki/Chlorophyll_fluorescence, accessed from the Internet, Nov. 29, 2016, 9 pages.
Entire patent prosecution history of U.S. Appl. No. 15/369,276, filed Dec. 5, 2016, entitled "Lighting Device Incorproating a Hyperspectral Imager as a Reconfigurable Sensing Element."
Pervez et al., "Photonic crystal spectrometer", vol. 18, No. 8, Optics Exp0ress, Apr. 12, 2010, pp. 8277-8285.
Non Final Office Action for U.S. Appl. No. 15/668,246, dated Feb. 25, 2019; 42 pages.
Notice of Allowance for U.S. Appl. No. 15/369,276, dated Mar. 28, 2019, 13 pages.

* cited by examiner

LIGHTING DEVICE INCORPORATING A HYPERSPECTRAL IMAGER AS A RECONFIGURABLE SENSING ELEMENT

RELATED APPLICATION

This application is a Continuation Application of U.S. application Ser. No. 15/369,276, now allowed, filed on Dec. 5, 2016 entitled, "Lighting Device Incorporating A Hyperspectral Imager As A Reconfigurable Sensing Element," which is related to U.S. application Ser. No. 15/247,076 filed on Aug. 25, 2016, now allowed, entitled, "Fixture That Provides Light Incorporating A Reconfigurable Spectrometer," the entire contents of which are incorporated herein by reference.

BACKGROUND

After the invention of the light bulb, lighting devices have become ubiquitous in society. Nearly all private and public buildings and/or spaces have some form of a lighting device to provide some form of general illumination, whether it is to illuminate a room, hallway, street, roadway or the like. The number of lighting devices in the world numbers in the billions.

Since lighting devices are located in most populated areas, the lighting devices have also been used to provide functions besides lighting. For example, lighting devices have incorporated sensors such as room occupancy sensors that are used to control light, smoke detectors and/or gas detectors, such as sensors of carbon monoxide, carbon dioxide, or the like, that are used to alert persons in the vicinity of and/or remote from the lighting device of the presence of smoke and/or a harmful gas. Sensors integrated into lighting devices typically have been single purpose devices. For example, to implement occupancy sensing, smoked detection and carbon dioxide sensing in one lighting device might involve installation of three different types of sensors for the different purposes in one lighting device.

One sensing device that may be used to analyze multiple chemicals simultaneously is a hyperspectral imager. A hyperspectral imager may be a charge-coupled device (CCD) image sensor, a complimentary metal-oxide-semiconductor (CMOS) image sensor, or imaging cameras, such as a scanning camera, forward-looking infrared (FLIR) camera, or the like. The hyperspectral imager is configured to detect the intensity of light over a continuous portion of an electromagnetic spectrum.

The hyperspectral imager may output an image in which each pixel includes information detected by the image sensor derived from all wavelengths within the continuous portion of the electromagnetic spectrum being imaged. The hyperspectral imager outputs data that when presented on a display device is an image representative of the "spectrum" of a scene or object being imaged.

In contrast, multispectral imaging typically refers to imaging specific, non-contiguous bands of the electromagnetic spectrum. As a result, the multispectral image does not provide a "continuous spectrum" of a scene or object, but, instead provides an object's spectral contribution to the specific band being imaged.

While digital cameras typically use red, green, and blue visible light filters when producing an image, a hyperspectral imager has a broader spectral resolution than a common digital camera. New imaging technology is enabling the hyperspectral imager to be drastically reduced in price and size. Hyperspectral imagers previously cost tens of thousands of dollars and were large. The smallest of these hyperspectral imagers could only fit on top of a desk. However, in recent years, hyperspectral imagers have become small enough to fit in a person's hand.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

Figure 1:
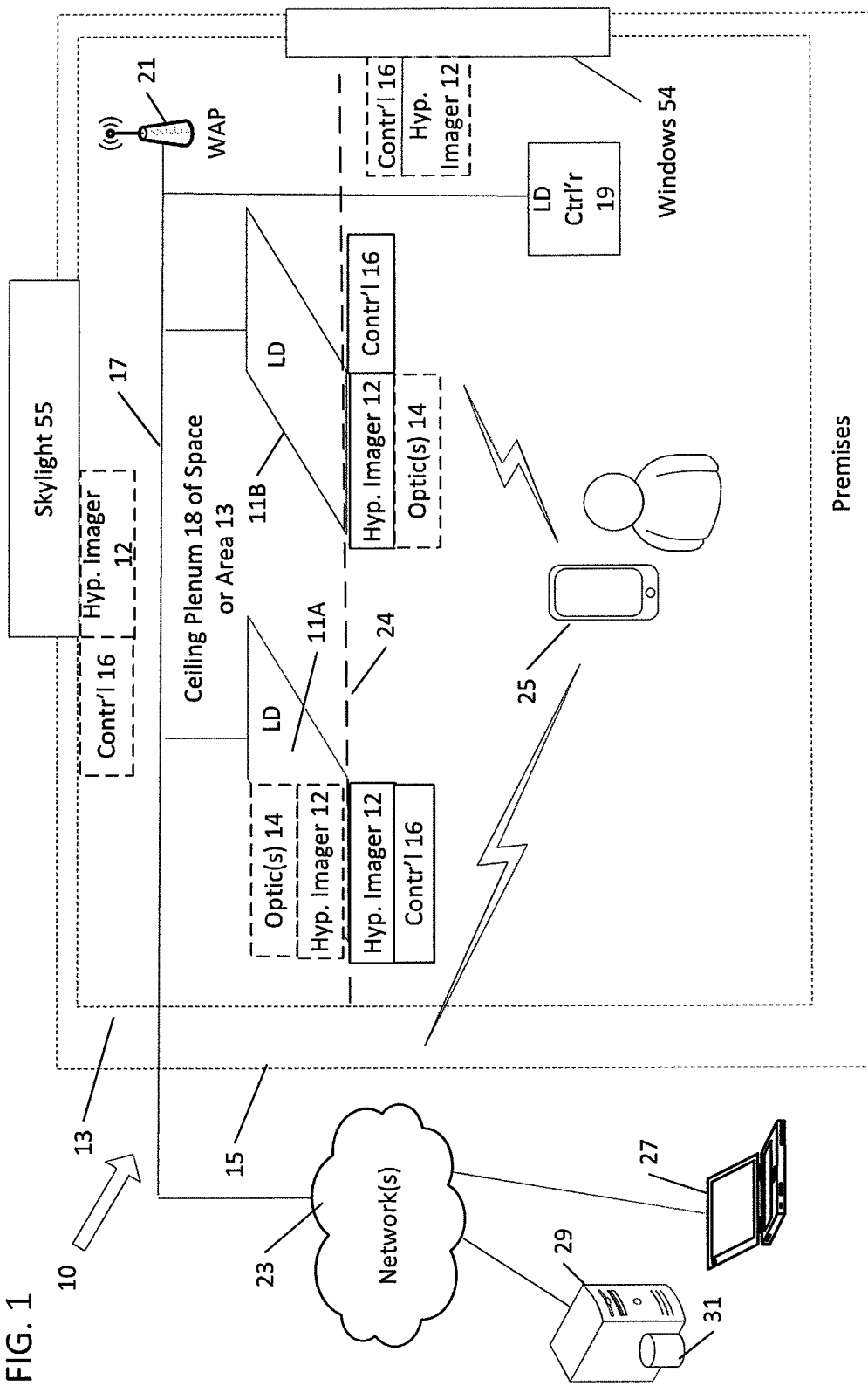
FIG. 1 illustrates a general example of a system incorporating configurable hyperspectral imagers in a variety of artificial lighting and daylighting type lighting devices.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

A hyperspectral imager as described in some of the examples may include a set of filters and a CCD or CMOS image sensor. The hyperspectral imager may be, for example, configured to detect the intensity of light over a continuous portion of an electromagnetic spectrum of interest. For example, the portion of the electromagnetic spectrum of interest may include light in one of the ultraviolet, visible, or infrared, both the near-infrared (NIR) and thermal infrared ranges. The set of filters may be a number of filters that enable a range of contiguous wavelengths to be detected by the image sensor. The range of wavelengths may be a narrow contiguous band (e.g., 750 nm to 850 nm) of wavelengths, but over which a number (e.g., 25-100) of sample wavelengths may be taken. Alternatively, the range of wavelengths may be a broad range from less than (<) 100 nm to 100 µm with much larger number of samples, such as 10,000 samples. Each example would generate a large amount of data.

The image sensor is a two-dimensional (e.g., X-Y axes) sensor that detects light of a given wavelength depending upon the filter through which the light is detected by the image sensor. The image sensor may produce one or more frames of data (in X-Y axes) for each filter. The hyperspectral imager may output a three-dimensional data set (e.g., X-Y-Z axes, with the Z axis being the respective individual wavelengths in the detected contiguous band of wavelengths). For example, if the data of each X-Y frame is presented as an image, each pixel of the image includes information detected by the image sensor derived from the particular Z-axis wavelength within the continuous range of wavelengths being presented. The outputted image is representative of the "spectrum" of a scene or object being imaged by the hyperspectral imager. In summary, the data generated by the hyperspectral imager is a three-dimensional cube of data that provides for each point in the X-Y plane a "continuous spectrum" in the Z-axis based on the wavelengths being detected.

Each image sensing element of the hyperspectral imager measures an intensity of the different wavelengths of the spectral range represented by the light incident on respective image sensing element. The hyperspectral image data may be compared to a reference spectral intensity pattern stored in memory. A "reference spectral intensity pattern" may be a pattern of known hyperspectral image data values, or image data values over a sub-range of the detected spectra, of different compounds, objects or the like, that represent uniquely identifying characteristics of an object's spectral elements.

A hyperspectral imager detects intensity of a greater number of different wavelengths in a continuous, broader range than can be distinguished from a camera's few visible light filters. A hyperspectral imager may provide image data by using a larger number of narrowband, but continuous light wavelength filters, for example, by overlapping the filters, over the input to an image sensor. Alternatively, a hyperspectral imager may utilize an optical device, such as a prism, a beam splitter or a diffraction grating positioned such that the output of the optical device is directed to the image sensor array thereby separating the spectral range for imaging by separate image sensors of the imager. The image sensor of the hyperspectral imager is responsive to the various wavelengths of light and outputs image data representative of the incident intensity of the light of each particular narrow wavelength band at each pixel of the image data. Based on the incident wavelength intensity at each pixel for each wavelength (Z-axis) in the continuous range of wavelengths, a computer processor is able to determine a type or even the chemical composition of an object passing, reflecting or emitting the light in the range of continuous wavelengths being imaged.

Hence a need exists for improving sensor capabilities associated with a lighting device to provide more useful data, e.g., spectral data, in order to provide an analysis of the environment in which the lighting device is installed.

Chemicals, particulates, contaminants or the like, either airborne or on a surface, will be referred to herein generally as "substances." A system incorporating the hyperspectral imager as described herein can be configured to look for new substances by receiving a software or firmware update in order to detect the new substances. The analysis of the hyperspectral imager data for chemicals, particulates, contaminants or the like, either airborne or on a surface, is referred to herein as environmental analysis. Environmental analysis involves the collection or detection by the hyperspectral imager of data representative of the substances, the subsequent analysis of the collected data performed by a processor, and the output of an analysis result report.

Other systems that may benefit from environmental analysis by adding a hyperspectral imager and related hardware to a lighting system include community water systems to constantly monitor, for example, for lead (Pb) and/or other chemicals, particulates, contaminants, hospitals to monitor hallways and entrances for bacteria and viruses, parks and nature preserves to monitor the health of vegetation and wildlife, and the like.

The examples discussed below relate to incorporating a hyperspectral imager into a lighting device such as a lighting device and use of the hyperspectral imager for lighting related operations and/or for other detection functions.

The term "lighting device" as used herein is intended to encompass essentially any type of device that processes, generates or supplies light, for example, for general illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition to light provided for an organism. However, it is also possible that one or more lighting devices in or on a particular premises have other lighting purposes, such as signage for an entrance or to indicate an exit. In most examples, the lighting device(s) illuminate a space or area of a premises to a level useful for a human in or passing through the space, e.g., general illumination of a room or corridor in a building or of an outdoor space such as a street, sidewalk, parking lot or performance venue, and serve to provide components usable in identifying chemical composition, biological materials and/or environmental materials in the environment in which the lighting device is located. The actual source of light in or supplying the light for a lighting device may be any type of light emitting, collecting or directing arrangement. The term "lighting device" encompasses passive lighting devices that collect and supply natural light as well as artificial lighting devices that include a source for generating light.

The term "passive lighting" as used herein is intended to encompass essentially any type of illumination that a device supplies without consuming electrical power to generate the light. A passive lighting device, for example, may take the form of a daylighting device, such as a window, skylight, light tube of the like, that supplies daylight that the device obtains outside a structure to the interior of the structure, e.g., to provide desired illumination of the interior space within the structure with otherwise natural light. As another example, a passive lighting device may include a phosphor or other wavelength conversion material, to enhance the light in a desired manner without consuming electrical power.

The term "artificial lighting" as used herein is intended to encompass essentially any type of lighting that produces light by processing of electrical power to generate the light. An artificial lighting device, for example, may take the form of a lamp, light fixture, or other luminaire that incorporates a light source.

A "light source" by itself contains no intelligence or communication capability. In the case of artificial lighting, the light source may be one or more LEDs or the like, or a lamp (e.g. "regular light bulbs," "tubes," incandescent or fluorescent) of any suitable type. In the case of passive lighting, the light source may ultimately be the Sun, Moon, stars or a combination of natural light sources. However, in a lighting device that supplies passive light, the light source may be tunnel, cavity, tube or, simply a passageway for light to enter an area or environment in which the lighting device is located.

The term "general illumination" as used herein is intended to encompass essentially any production of light for illuminating an area in which a lighting device is located. For example, a 400 Watt metal halide lamp installed in a high bay factory or warehouse lighting device may output light of approximately 38,000 Lumens, and a 200 Watt LED array in a high bay fitting may output approximately 20,000 Lumens. A 100 Watt incandescent light bulb or equivalent used in general domestic and task lighting may output light of approximately 1,700 Lumens. Similarly, a 32 Watt fluorescent tube may output illumination for an office lighting environment of approximately 1,600 Lumens. See, for example, the website greenbusinesslight.com for a further discussion of examples of general illumination. Similar amounts of natural light may be delivered for passive general illumination.

The term "coupled" as used herein refers to any logical, physical or electrical connection, link or the like by which signals, data, instructions or the like produced by one system element are imparted to another "coupled" element. Unless described otherwise, coupled elements or devices are not necessarily directly connected to one another and may be separated by intermediate components, elements or communication media that may modify, manipulate or carry the signals. For example, system elements may be coupled for wired or wireless communication.

Reference is now made in detail to the examples illustrated in the accompanying drawings and discussed below.

The example of FIG. 1 illustrates a system 10 for communicating with a lighting device 11 (labeled "LD" in FIG. 1) incorporating hyperspectral imagers 12 as a reconfigurable sensing element, e.g., based on a user selection and/or a software update. For example, elements of a particular lighting device may be "reconfigurable" e.g. to compare the hyperspectral image data obtained by the hyperspectral imager to the reference spectral intensity patterns stored in the memory to identify different environmental conditions, such as substances or compositions. In the example, each of the lighting devices 11A and 11B are equipped with a hyperspectral imager 12 that is reconfigurable sensing elements. The lighting devices 11A and 11B, as well as some other elements of system 10, are installed within a space or area 13 to be illuminated and/or subject to analysis by the hyperspectral imagers 12 at a premises 15. For example, the hyperspectral imagers 12 may be integrated within the device 11A and/or 11B. The hyperspectral imagers 12 may be configured to obtain three dimensional spectral intensity distribution measurements that are represented as hyperspectral image data.

The premises 15 may be any location or locations serviced for lighting and other purposes by such system of the type described herein. Most of the examples discussed below focus on building installations, although the examples of FIGS. 3-7 illustrate systems that have been adapted to outdoor lighting and environmental analysis. Hence, the example of system 10 may provide lighting, environmental analysis and possibly other services in a number of service areas in or associated with a building, such as various occupiable rooms, equipment rooms, hallways, corridors or storage areas of a building (e.g., home, hospital, office building, schools, food service areas) and outdoor areas associated with a building or campus). Any building forming or at the premises, for example, may be an individual or multi-resident dwelling or may provide space for one or more enterprises and/or any combination of residential and enterprise facilities.

The occupiable space or area 13 of premises 15 may also be illuminated by natural light that enters through windows 54 and skylight 55. The window 54 and skylight 55 are examples of passive lighting devices as described above. The skylight 55 may also be a hyperspectral imager-equipped lighting device that is installed in the roof of premises, such as 15, to illuminate an area or space, such as 13. The hyperspectral imager 12 with a controller 16 may be coupled to the skylight 55. Similarly, the window(s) 54 may also be coupled to a hyperspectral imager-equipped lighting device including a hyperspectral imager 12 and a controller 16 that is installed in a wall of premises, such as 15, to illuminate an area or space, such as 13. In such a configuration, the window 54 may also be a hyperspectral imager-equipped device. The controller 16 may include a processor and memory, examples of which are explained in more detail with reference to the elements of controller 204 of FIG. 2. The controller 16 may use the hyperspectral imager 12 to perform an environmental analysis of air and surfaces within the premises 15 based on the natural light passing through the skylight 55 and/or window 54. For example, the natural light may illuminate the air or a surface in the vicinity of the skylight 55 and/or window 54, and the hyperspectral imager 12 may detect reflected or incident light, output signals representative of an overall optical power intensity as well as optical power distribution of the detected light. The controller 16 analyzes the signals generated by the hyperspectral imager in response to detecting light in relation to reference data, for example, for control purposes, for communications regarding detection results, etc.

The system elements, in a system like system 10 of FIG. 1, may include any number of lighting devices 11A or 11B equipped with a hyperspectral imager that operates as a reconfigurable sensor as well as one or more lighting device controllers 19. Lighting device (LD) controller 19 may be configured to provide control of lighting related operations (e.g., ON/OFF, intensity, brightness, image control signals and general illumination control signals) of lighting devices 11A and 11B. Alternatively, or in addition, LD controller 19 may be configured to provide control of the hyperspectral imager aspects of lighting devices 11A and 11B, as described in greater detail below. That is, LD controller 19 may take the form of a processor, such as a switch, a dimmer, or a smart control panel including a user interface depending on the functions to be controlled through LD controller 19. The LD controller 19 may send commands to the lighting device 11A or 11B that are executed by processing elements (described in more detail with reference to other examples below) present in the lighting devices 11A and 11B. The lighting system elements may also include one or more hyperspectral imagers 12 used to control lighting functions, such as occupancy sensors, ambient light sensors and light, temperature sensors or environmental analysis within the premises that detect conditions of or produced by one or more of the lighting devices.

The on-premises system elements 11A, 11B, 12, 19, in a system like system 10 of FIG. 1, are coupled to and communicate via a data network 17 at the premises 15. The data network 17 in the example also includes a wireless access point (WAP) 21 to support communications of wireless equipment at the premises. For example, the WAP 21 and network 17 may enable a user terminal for a user to control operations of lighting devices 11A and 11B. Such a user terminal is depicted in FIG. 1, for example, as a mobile device 25 within premises 15, although any appropriate user terminal may be utilized. However, the ability to control operations of lighting devices 11A and 11B may not be limited to a user terminal accessing data network 17 via WAP 21 within premises 15. Alternatively, or in addition, a user terminal such as computer 27 located outside premises 15, for example, may provide the ability to control operations of lighting devices 11A and 11B via one or more other networks 23 and the on-premises network 17. Network(s) 23 includes, for example, a local area network (LAN), a metropolitan area network (MAN), a wide area network (WAN) or some other private or public network, such as the Internet.

For lighting operations, the system elements for a given service area such as devices 11A and 11B, hyperspectral imagers 12 and/or controller(s) 19 are coupled together for network communication with each other through data communication media to form a portion of a physical data communication network. Similar elements in other service areas of the premises are coupled together for network communication with each other through data communication media to form one or more other portions of the physical data communication network at the premises 15. The various portions of the network in the service areas in turn are coupled together to form a data communication network at the premises, for example to form a LAN or the like, as generally represented by network 17 in FIG. 1. Such data communication media may be wired and/or wireless, e.g. cable or fiber Ethernet, Wi-Fi, Bluetooth, or cellular short range mesh. In many installations, there may be one overall data communication network 17 at the premises. However, for larger premises and/or premises that may actually encompass somewhat separate physical locations, the premises-wide network 17 may actually be built of somewhat separate but interconnected physical networks utilizing similar or different data communication media.

System 10 in the example also includes server 29 and database 31 accessible to a processor of server 29. Although FIG. 1 depicts server 29 as located outside premises 15 and accessible via network(s) 23, this is only for simplicity and no such requirement exists. Similarly, although FIG. 1 depicts database 31 as physically proximate server 29, this is only for simplicity and no such requirement exists. Instead, database 31 may be located physically disparate or otherwise separated from server 29 and logically accessible by server 29, for example via network 17.

Database 31 may be a collection of spectral reference data including reference spectral intensity patterns stored in data files for use in conjunction with the reconfigurable sensor that includes a hyperspectral imager 12. The collection of spectral reference data may be augmented, or further processed, by using artificial intelligence algorithms capable of learning to analyze the collection of spectral reference data based on information obtained from spectral image data of both known and unknown environmental conditions, thereby improving the quality of the analysis as well as being able to adapt the spectral reference data to evolving environmental conditions or the like. In addition, external databases containing spectral reference data of other environmental conditions and/or processing algorithms for analyzing the hyperspectral image data may be accessed via a network, such as 23, for use in analyzing hyperspectral image data. The collection of spectral reference data may be updated based on changes to the reference spectral intensity pattern(s). For example, the spectral reference data within the database 31 may include a reference spectral intensity pattern that uniquely identifies an environmental condition based on a chemical composition, a biological material, or an environmental material of a substance, for comparison to the hyperspectral image data generated by the hyperspectral imager. Alternatively or in addition, the reference spectral intensity pattern may be related to one or a combination of various different substances, such as different types of chemicals, biological materials, particulates and contaminants, such as smoke, carbon monoxide, carbon dioxide, Methicillin-resistant *Staphylococcus aureus* (MRSA), natural gas, or the like. The reference spectral intensity pattern may include optical power intensity values over a continuous range of different wavelengths or even a range of wavelengths within narrow wavelength bands of visible and/or infrared light that are used by the processor when executing program instructions stored in the memory (which will be described in more detail with reference to the example illustrated in FIG. 2) to detect the presence of one or more substances depending upon the reference spectral intensity pattern data included in the spectral reference data. In one example, selected spectral reference data from among the collection of spectral reference data is loaded into a memory of the hyperspectral imager-equipped lighting devices 11A, 11B, 54 and 55, and the hyperspectral imager-equipped lighting devices 11A, 11B, 54 and 55 are configured to detect and output a detection report in accordance with the reference data included in the selected spectral reference data. That is, the selected spectral reference data enables lighting devices 11A, 11B, 54 and 55 to be reconfigured to detect a specific list of chemicals, particulates, contaminants or the like for environmental analysis.

In the example, devices 11A, 11B, 54 and 55 may store the same spectral reference data in data files into their respective memories (not shown). It should be appreciated, however, that different lighting devices may store different spectral reference data to selectively configure the respective hyperspectral imagers 12 to detect different substances. For example, lighting devices 54 and 55 may be configured to detect the presence of smoke, whereas lighting devices 11A and 11B may be configured to detect carbon monoxide.

It should also be noted that, while various examples describe loading a single reference spectral intensity pattern from the spectral reference data into the respective memories of lighting devices 11A, 11B, 54 and 55, this is only for simplicity. Lighting devices 11A, 11B, 54 and 55 may receive one, two or more reference spectral intensity patterns from the spectral reference data; and the spectral reference data including the received reference spectral intensity pattern may be stored within lighting devices 11A, 11B, 54 and 55. In such a situation, lighting devices 11A, 11B, 54 and 55 may, at various times, operate in accordance with spectral reference data in any one of multiple files, e.g., operate in accordance with a first spectral reference data file during daylight hours and in accordance with a second spectral reference data file during nighttime hours or in accordance with different spectral reference data selections from a user operator at different times, and the like. The spectral reference data may include a reference spectral image pattern, an identifier, a name and/or harmful level, if appropriate, for each of the environmental conditions that the individual hyperspectral imager-equipped lighting device is specifically configured to detect. Depending upon the environmental condition to be detected, the first set of spectral reference data may be different from the second spectral reference data, or may be substantially the same. Alternatively, lighting devices 11A, 11B, 54 and 55 may only store a single spectral reference data file.

Continuing with reference to FIG. 1, the lighting devices 11A and 11B may have different configurations, and may be implemented using different and/or similar components. For example, a device, such 11A, may be installed within a ceiling plenum 18 of an area or space 13 and be coplanar with ceiling plane 24. The lighting device 11A may protrude into the ceiling plenum 18 of the area or space 13, while part of a housing (not shown in this example) of the lighting device 11A may be substantially coplanar with the ceiling plane 24. The device 11A is shown with a hyperspectral imager 12 that detects light in the space 13 below the ceiling plane 24. In an optional configuration, the device 11B may be configured with another hyperspectral imager 12 that protrudes into the area or space 13 along with optional optics 14. In yet another example, a hyperspectral imager 12 may be used either in the ceiling plenum 18 to detect environmental conditions within the ceiling plenum 18, or below the ceiling plane 24 in the space 13. The ceiling plenum 18 is bounded by ceiling plane 24 and the bottom of a floor forming an upper boundary (not shown) of the ceiling plenum 18 or a roof (not shown) of the space 13.

To fully appreciate the present concepts, it may be useful to discuss examples of a hyperspectral imager-equipped lighting device in somewhat more detail. Hence, the following discussion provides examples of configurations for implementing a hyperspectral imager-equipped lighting device in the system 10 of FIG. 1.

Figure 2:
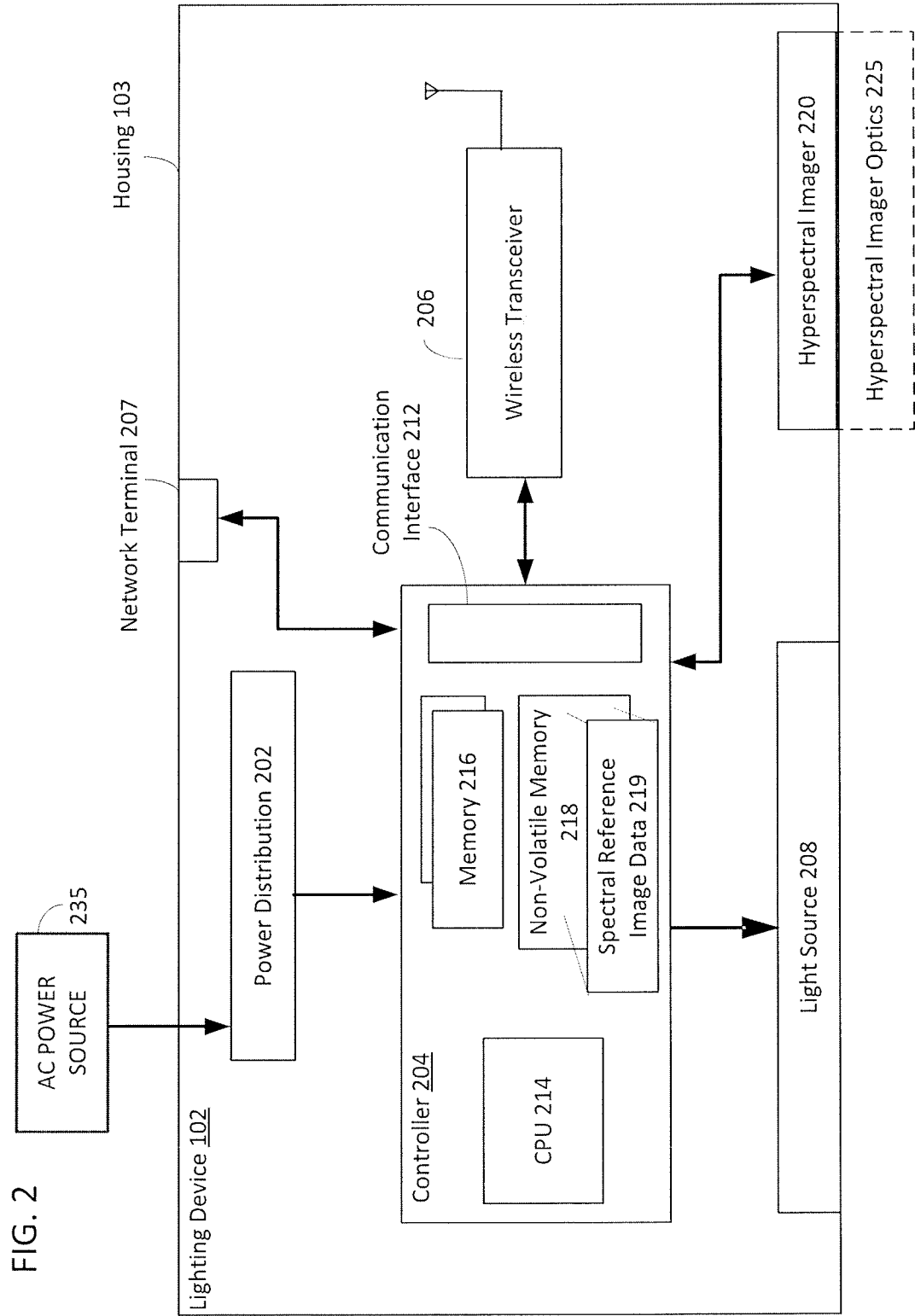
FIG. 2 is a functional block diagram illustrating details of an artificial lighting example of a device incorporating a hyperspectral imager.

FIG. 2 is a functional block diagram illustrating details of a lighting device incorporating a hyperspectral imager as described herein. An example of a lighting device 102 is shown in FIG. 2 where the lighting device 102 includes a housing 103, a light source 208, a hyperspectral imager 220, a controller 204, a wireless transceiver 206, and a wired network terminal 207. The communication interface 212 is coupled to a data communication network via either the wireless transceiver 206, the wired network terminal 207, or both. The controller 204 has an internal processor configured as a central processing unit (CPU) 214, a memory 216, a non-volatile memory 218 and a communication interface 212. The memory 216 or 218 stores spectral reference data and program instructions for analyzing the hyperspectral imager 220 generated signals. The processor 214 is coupled to the power distribution 202, the memory 216, 218, 219, the communication interface 212, the light source 208, the hyperspectral imager 220, and the wireless transceiver 206. The processor 214, when executing the stored program instructions is configured to perform various functions related to the analysis of data signals generated by the hyperspectral imager (described in more detail below). The processor 214 and associated memories 216, 218, and 219 in the example of the device 102 are components of the controller 204, which is a microchip device that incorporates the CPU 214 as well as the one or more memories 216, 218, 219. The controller 204 may be thought of as a small computer or computer-like device formed on a single chip. Alternatively, the processor 214 and memory 216 or 218 may be implemented as separate components, e.g., by a microprocessor, ROM, RAM, flash memory, etc. The housing 103 may serve to protect the components of the lighting device 102 from the dust, dirt, water (e.g., rain) or the like in the location in which the device is installed.

Also included in the example lighting device 102 is a power distribution unit 202 receiving power from an external alternating current (AC) power source 235. The power distribution unit 202 is configured to distribute electrical power to the various components within the lighting device 102. For example, the light source 208 is an artificial light generation device configured to generate illumination upon consumption of electrical power from a power source, such as 235.

This example of the lighting device 102 includes the capabilities to communicate over two different radio frequency (RF) bands, although the concepts discussed herein are applicable to control devices that communicate with luminaires and other system elements via a single RF band. Hence, in the example, the lighting device 102 includes a transceiver 206, which may be configured for sending/receiving control signals, and/or for sending/receiving pairing and commissioning messages. For example, the transceiver 206 may be one or more transceivers configured as a 900 MHz transceiver for such an implementation a variety of controls are transmitted over the 900 MHz control band of the wireless control network 5, including, for example, turn lights on/off, dim up/down, set scene (e.g., a predetermined light setting), and sensor trip events. Alternatively, the transceiver 206 may be configured as a 2.4 GHz transceiver for Bluetooth low energy (BLE) that carries various messages related to commissioning and maintenance of a wireless lighting system. The wireless transceiver 206 coupled to the communication interface 212 and to a wireless network, such as 23 or 17 via the wireless access point 21 of FIG. 1. The wireless transceiver 206 is, for example, configured to transmit the detection signals output by the processor 214 to a device, such as such as devices 25, 29 and/or 27 of FIG. 1, external to the environment in which the lighting device 102 is located.

In the example of FIG. 2, lighting device 102 is shown as having one processor 214, for convenience. In some instances, such a lighting device may have multiple processors. For example, a particular device configuration may utilize a multi-core processor architecture. Also, some of the other components, such as the communications interfaces, may themselves include processors.

In general, the controller 204 of the lighting device 102 controls the various components of the lighting device 102 and devices, such as the light source 208 and hyperspectral imager 220, connected to the controller 204. For example, controller 204 may control RF transceivers 206 to communicate with other RF devices (e.g., wall switches, sensors, commissioning device, etc.). In addition, the controller 204 controls the light source 208 to turn ON/OFF automatically, or at the request of a user. In addition, controller 204 controls other aspects of operation of the light source 208, such as light output intensity level, or the like.

The controller 204 also controls the hyperspectral imager 220, and if the lighting device 102 is so equipped, the hyperspectral imager optics 225. The optics 225 may be controllable to aim, change focus (e.g., zoom in and out), and perform other optical manipulations. For example, the controller 204 may perform the general functions of turning the hyperspectral imager ON or OFF, receiving data from the hyperspectral imager 220, and the like. In addition, the controller 204 may turn the hyperspectral imager light 224 ON or OFF at the same time that the hyperspectral imager 220 is turned ON or OFF. The controller 204 may also control exposure time, frame rate and similar image collection functions depending upon the limits of the hyperspectral imager hardware and components. Alternatively, the hyperspectral imager 220 may continuously collect and analyze image data since electrical power is received from electrical AC mains, such as AC power supply 235 in which case, power conservation may not be a design consideration.

The lighting device 102 may receive spectral reference data via the communication interface. The spectral reference data may include data that enables identification of one or more substances. For example, the spectral reference data may include a reference spectral intensity pattern that uniquely identifies an environmental condition. An environmental condition may be, for example, a substance, a chemical composition, a biological material, or an environmental material. The reference spectral intensity pattern may be light intensity values within a continuous range of wavelengths that are unique to an environmental condition. There may be a number of reference spectral intensity patterns. Each reference spectral intensity pattern may be directed to a particular environmental condition having a specific chemical composition, a specific biological material, or a specific environmental material in a number of different ranges of continuous wavelengths. For example, the MRSA bacteria when imaged in different ranges of continuous wavelengths of light (visible and non-visible) may produce different spectral intensity distributions. Hence, there may be several different reference spectral intensity patterns over different ranges of continuous wavelengths. The particular spectral intensity distribution from a set of spectral intensity distributions of MSRA collected by measuring the intensity of different continuous ranges of wavelengths may be identifiable from the generated hyperspectral image data depending upon the continuous range of wavelengths measured by the hyperspectral imager.

In addition, each of the chemical compositions, biological materials and environmental materials of the particular substance may have a unique identifier associated with it. An "identifier" may be a code or a series of values that corresponds to a specific substance (chemical composition, biological material or environmental condition, such as the presence of smoke, or the like). For example, the spectral reference data may be associated with the identifier that may be related to one or more of bacteria, viruses, explosives or chemical components thereof, smoke, carbon monoxide, carbon dioxide, natural gas, or the like, and that corresponds to one or more of the image data signals generated by the hyperspectral imager. The spectral reference data may also include other information such as values that indicate harmful levels (e.g., X parts per million) of the substance, substance names, environmental condition category (e.g., chemical, bacteria, viral, gas, and the like.) or the like. This other information may be included in the outputted report. The received spectral reference data is stored in the memory 216 or 218. The memory 216 or 218 in addition to the spectral reference data may also store program instructions for processing and analyzing the hyperspectral imager 220 generated signals, such as the hyperspectral image data generated by the hyperspectral imager 220.

The hyperspectral imager may be configured to output continuous-spectrum image data based on the measured intensity of a spectral range of light detected from a particular object (i.e., liquid, solid, or gas) in the field of view of the hyperspectral imager.

A hyperspectral imager in a lighting device is advantageous because the hyperspectral imager can provide data for analysis of the environment around the lighting device. The provided data may be simultaneously analyzed for the presence of multiple chemicals, particulates, contaminants or the like, either airborne or on a surface. New hyperspectral imagers are being drastically reduced in price and size. Structures where lighting products and building management products reside would benefit from a more comprehensive analysis of the environment around them than offered by use of special purpose sensors in or around the lighting devices. For example, a building heating, ventilation and air conditioning (HVAC) control system can take advantage of detection of humidity ($H_2O$), carbon monoxide (CO), carbon dioxide ($CO_2$), smoke, natural gas, biological material (e.g., bacteria (Methicillin-resistant *Staphylococcus aureus* (MRSA)), viruses, blood, or the like), other noxious gases, solids, liquids or the like to report on sensed conditions and/or to adjust operation of one or more controllable components of the HVAC system.

The processor 214 of the controller 204 may also be configured when executing programming stored in the memory 216, 218 and/or 219 to analyze the hyperspectral image data generated by the hyperspectral imager 220 using image processing analysis techniques in relation to the spectral reference data. The image processing analysis techniques may be embodied in programming instructions stored in the memory 216 and/or 218. For example, a software product such as Spectronon from Resonon (See, for example, resonon.com/Products/spectronon) or a hyperspectral imaging software program provided by Middleton Spectral Vision (See, for example, middletonspectral.com). The image processing software may provide, for example, a pattern recognition function that includes the capability to analyze the hyperspectral image data for patterns based on the reference spectral intensity patterns stored with spectral reference data. Based on the results of the image analysis of the hyperspectral image data, the processor 214 may detect an environmental condition in the environment in which the lighting device is located. In response to the detection, the processor 214 outputs, via the communication interface 212, a report of the detected environmental condition. The report may be output to an external device such as mobile device 25, computer 27, or server 29 and/or database 31 as shown in FIG. 1. The processor 214 in addition, or alternatively, to outputting the report may also adjust an output of the light source 208 in response to a predetermined output report. For example, in response to the detection of a high level of carbon monoxide in the output report, the processor 214 may control the light source 208 to output light that flashes between full intensity and a lower intensity that is noticeable to occupants in the area illuminated by the lighting device 102.

In a further example of the operation of the example of FIG. 2, the processor 210 is coupled to the memory 216, 218, the communication interface 212, the light source 208 and the hyperspectral imager 220. The processor 210 may receive via the communication interface 212 updated spectral reference data. The updated spectral reference data may include updated reference spectral intensity patterns uniquely identifying a chemical composition, a biological material, or an environmental material (or condition) for comparison to the spectral intensity distributions output by the hyperspectral imager 220. Alternatively or in addition, the updated spectral reference data may be different from previously stored spectral reference data. For example, the updated spectral reference data may include one or more reference spectral intensity patterns that uniquely identifying a different chemical composition, a different biological material, or a different environmental material than the previously-stored reference spectral intensity patterns. Alternatively or in addition, the updated spectral reference data may change one or more of the chemical composition identifier, the biological material identifier, or the environmental material identifier stored in the memory 216 and/or 218.

Alternatively or in addition in another example, the processor 214 may be configured to receive additional spectral reference data via the communication interface, wherein the additional spectral reference data includes a reference spectral intensity pattern related to a substance present in the hyperspectral image data. The additional spectral reference data may augment the number of different substances that may be detected by the lighting device 102. The additional spectral reference data may also include additional information to supplement spectral reference data for a specific substance. For example, the additional spectral reference data includes a reference spectral intensity pattern related to a substance associated with the environmental condition present in the hyperspectral image data. The received additional spectral reference data is store in the memory 219 with previously stored spectral reference data. The processor 214 is configured to access the stored additional spectral reference data and previously stored spectral reference data in the memory 219.

The processor 214, for example, uses the stored additional spectral reference data and previously stored spectral reference data (collectively referred to as the "spectral reference data") to analyze the hyperspectral image data generated by the hyperspectral imager. The analysis may, for example, include comparing the hyperspectral image data generated by the hyperspectral imager to the spectral intensity distribution data in the spectral reference data stored in the memory. Based on the results of the comparison, the processor 214 may identify one or more of identifiers in the spectral reference data that correspond to the hyperspectral image data for inclusion in the outputted report. The processor 214, based on an analysis of the hyperspectral image data generated by the hyperspectral imager in relation to the spectral intensity distribution of the stored data file, may output one or more identifiers associated with a detected substance in the outputted report.

The hyperspectral imager 220 may be coupled to the housing 103. The hyperspectral imager 220 may be configured to detect light and generate hyperspectral image data from selected intensities of different wavelengths of the detected light.

The processor 214 is configured to communicate information included with both or either the updated or the previously-stored spectral reference data, such as an identifier associated with identified chemical compositions, biological materials related to environmental conditions detected by the hyperspectral imager 220 over a network via the communication interface 212. For example, the processor 214 receives a signal containing image data that was generated by the hyperspectral imager 220. The processor 214 (labeled "CPU") of the controller 204 may access the stored spectral reference data in the memory 216 and/or 218, and analyzes the received signal with respect to the spectral reference data stored in the memory 216 and/or 218 to determine, for example, a chemical composition of the air in a measurement volume (explained in more detail with reference to the examples of FIGS. 3-10). For example, the spectral reference data may be stored in the memory in a data file containing the reference spectral intensity pattern corresponding to a particular substance having a specific chemical composition identifiable from the signal containing the image data generated by hyperspectral imager.

In another example, an identifier included in the spectral reference data for one composition might be, for example, $CO_2$ and that identifier would correspond to the spectral reference data, which may include the reference spectral intensity pattern, associated with $CO_2$ in the air. The processor 214, during the analysis, compares image data signals received from the hyperspectral imager 220 having a measured spectral intensity distribution to reference spectral intensity patterns of the spectral reference data 219 stored in memory 218; and if there is a match, the processor 214 uses the corresponding composition identifier, such as $CO_2$, for event reporting or control operations. Based on results of the analysis of the stored spectral reference data and image data signals generated by the hyperspectral imager 220, may determine the presence of an environmental condition in the environment in which the device 102 is located. In response to the detected environmental condition, the controller 204 may output a report of the detected environmental condition. For example, the wireless transceiver 206 that is to the communication interface and to a wireless network, may be configured to transmit the report of the detected environmental condition output by the processor to a device, such as 25, 27 and/or 29 of FIG. 1, external to the environment in which the lighting device is located. A report, for example, may be a list of values that correspond to an identifier of the detected substance. Or, the report may have one or more identifiers associated with one or more of a bacteria, a virus, smoke, carbon monoxide, carbon dioxide, natural gas, or the like. The list is not exhaustive but it is envisioned that the list of identifiers may include all substances detectable by the hyperspectral imager 220. Alternatively, the report may simply list chemicals, contaminants or whatever substance the spectral reference data includes reference data to detect along with the specific substance that was detected, such as smoke or CO. Alternatively, the report may output detected values. For example, the data in the report, such as values, may be converted by the processor 214 to some meaningful scale, such as Parts Per Million (PPM) or the like, and the associated substance, e.g., smoke 100 PPM, CO 10 PPM, or the like. In yet another alternative, the report may be control signals that cause the lighting device to perform certain functions, such as, for example, the processor 214 may adjust a light output intensity of the light source 208 in response to a predetermined output report.

The device 102 may couple to a network, such as network 17 or 23 of FIG. 1, through the communication interface 212 which is connected for wired communication through the network terminal 207 or connected to wireless transceiver 206 for wireless communication. For example, the controller 204 may receive via the communication interface 212 updated spectral reference data that updates the spectral reference data 219 previously stored in the non-volatile memory 218. More specifically, the device 102 equipped with the hyperspectral imager 220 may be configured to detect smoke, in the case of fire, according to the spectral reference data 219 stored in the memory 218. The updated spectral reference data (not shown) may, for example, update the smoke reference data by also including carbon monoxide (CO) reference data in spectral reference data file. After the update of the spectral reference data, the hyperspectral imager-equipped device 102 is able to output a detection result indicating that smoke and/or CO are present in the environment in the vicinity of the lighting device 102. For example, if the hyperspectral imager-equipped device 102 is located in a hospital, the spectral image data may contain reference data for smoke, CO, oxygen gas ($O_2$), MRSA, or other staph infections, blood or the like.

Other examples of configurations of devices and the control functions performed by a controller, such as 210, with respect to other examples of the hyperspectral imager 220, hyperspectral imager light source 224 and/or hyperspectral imager-coupled optics 225 are explained in more detail below with reference to the examples of FIGS. 3-10.

In a specific example, the hyperspectral imager 220 may be an element of a lighting device 102. The imager 220 is used to measure one particular environmental event, such as the presence of a noxious gas plume, and later with the same hardware and a software change, the hyperspectral imager-equipped lighting device 102 is able to measure a different characteristic present in the environment, such as the presence of a biological material, such as bacteria or presence of an invasive plant species. The hyperspectral imager-equipped lighting device 102 may later be updated, via a hardware and/or software change, to measure/detect yet more or less items such as toxins on a surface in the environment in which the lighting device 102 is located or the like.

In addition, most environmental sensors are currently configured as a single item sensor and detectors. A sensor that detects humidity, for example, may not detect carbon monoxide (CO). In order to detect both humidity and CO, an additional CO detector must be obtained. Any additional detectors require the additional purchase of a sensor to detect the particular item of interest. As a result, the cost and complexity of detection systems increases. An advantage of a hyperspectral imager in the lighting device is the ability to unobtrusively and simultaneously collect image data in a continuous range of dozens or hundreds of narrow, adjacent spectral bands, while providing general illumination to the area in which the lighting device is located.

As mentioned above, hyperspectral imagers may be constructed in a number of ways. For example, different filters may be used to generate a hyperspectral image. Filters may be positioned over individual imaging elements of the imager in which case the spectral resolution may be dependent on the number of filters. In a specific example, a Fabry-Perot filter may be used that enables the hyperspectral imager's spectral resolution to be controlled by the spectral resolution of the Fabry-Perot filter. Alternatively, specific filters that are tuned to a specific requirement regarding an object to be detected in the environment may be selected. For example, a filter that matches the spectrum for carbon dioxide ($CO_2$) may be selected, and the resulting image may be compared to a reference $CO_2$ image. While such a hyperspectral imager implementation may have a lower cost and higher sensitivity, the specific hyperspectral imager may not be programmable or updated by changing the software. For example, specific filters may be selected that detect the presence of light, the intensity, the color, the color quality (e.g., according to know color quality metrics), solar gain when measuring natural light, occupancy sensing, people counting, and/or temperature sensing.

Alternatively, the hyperspectral imager may collect data from such a broad and continuous range of the electromagnetic spectrum that only subsets of the data need to be analyzed to detect specific environmental conditions. For example, the hyperspectral imager may provide data from light detected from the ultraviolet range of 10 nm to the infrared range of 1 mm. In an example using the provided data, an indicator device that reacts by changing color (e.g., from red to blue, white to blue, or the like) in the presence of a particular gas or bacteria may be used in the environment. The hyperspectral-equipped lighting device may be configured to analyze the subset of the data collected that is in the range of 470-480 nm, which is the approximate range of wavelengths of blue light that will be reflected by the indicator device and detected by the hyperspectral imager.

In another example, a hyperspectral imager may be configured to generate data based on detected long-wave IR (5-18 µm) light, the temperature of objects may be measured by comparing the image data to a Planckian radiation reference image data. Using a hyperspectral imager and known image analysis techniques, the temperature of the objects in an area or environment can be individually measured as well as a temperature gradient of the object's surface. In addition, the hyperspectral imager may in addition to the long-wave IR data, also provide data in a range of the electromagnetic spectrum that enables the detection of the object's physical properties, such as material(s) from which the object is constructed, a toxin contamination level of the object's surfaces, and the like. The spectral response of many materials is known and these known spectral indicators may be provided to a processor analyzing the data provided by the hyperspectral imager.

Continuing with the temperature detection example, the described hyperspectral imager may be used as a fire sensor. For example, the hyperspectral imager may be configured to not only measure wavelengths useful for detecting the presence and/or number of occupants in an occupiable space, but may also identify hot spots (i.e., extremely high temperature areas) that could be on fire or ready to combust. As such, the hyperspectral imager may be configured to measure wavelengths that are useful for detecting pre combustion signatures, such as outgassing, smoke signatures, flames in the occupiable space, or the like. Simultaneously the image data from the hyperspectral processor may be analyzed to detect escape routes from the fire in the occupiable space.

Other uses may include the detection of a health conditions of humans or animals. For example, a hyperspectral imager configured to detect wavelengths, such long-wave IR (5-18 µm) wavelengths, may be used as a health sensor. For example, these long-wave IR wavelengths may be used to detect fevers, psoriasis, hot spots (on or in skin). Alternatively, color analysis may be used to identify symptoms of medical issues based on skin color analysis, such as Hepatitis symptoms, bruising, bed sores, jaundice or the like, or detect medical issues indicated by eye color changes or systems, such as symptoms of hepatitis, or the like. In addition, a hyperspectral imager may be configured in combination with different light sources, such as an ultraviolet light source, and/or different substances, such as a chemical or gas, applied to an environment, to detect wavelengths of light related to the fluorescence of different objects, such as bacteria, blood, or other chemicals and substances, such as fingerprints. Fluorescence of the chlorophyll of a plant may also be useful in determining the health of plants. For example, hyperspectral imager-equipped lighting devices, such as 11A and 11B of FIG. 1, may be configured to operate the hyperspectral imager in cooperation with the artificial light source to detect fluorescence of a plant's chlorophyll (See for example, wikipedia.org/wiki/Chlorophyll fluorescence) or Misra et al., Chlorophyll Fluorescence in Plant Biology, Biophysics, Dr. Prof. Dr. A. N. Misra (Ed.), ISBN: 978-953-51-0376-9, InTech (2012)). Also, toxic or hazardous (e.g., oil) chemicals on surfaces may be detected by spectral analysis of image data captured by a hyperspectral imager in a lighting device. For example, ammonium nitrate, sodium benzoate, ascorbic acid and melamine have a spectral intensity pattern detectable within wavelength in approximately the 2750-3650 nm range. (See, for example, spectral imaging at laserfocusworld.com).

Another example for use of the hyperspectral imager may be in the monitoring of plant health. For example, the hyperspectral imager may collect image data related to agriculture, such as plant leaf color and size, detect insects and insect damage, signs of agrarian diseases and infections, fungi or the like. The collected agricultural-related hyperspectral image data may be analyzed. For example, gas emissions from and $CO_2$ concentration changes in a plant's leaves may indicate the health of a plant's photosynthesis system (See, for example, plant stress measurement at Wikipedia.org). Yet another use example is in the area of immigration, customs and law enforcement. For example, the hyperspectral imager and related processing may examine items for illegal substances, such as cocaine (using the IR spectrum may have a spectral intensity pattern that falls between approximately 2500-17000 nm). The hyperspectral image data may also be analyzed to determine whether a person is wearing a disguise, such as wigs and facial hair, by analyzing hyperspectral image data detected in the IR spectrum. In addition, the hyperspectral imager-equipped lighting device may be used to detect the presence of counterfeit goods such as money, logos, and/or fabric dies. For example, an item under ultraviolet light or IR light output by a light source of the lighting device may be imaged by the hyperspectral imager. The hyperspectral image data may be analyzed by an image processor to determine whether the different items' hyperspectral images are consistent with either an authentic or a counterfeit item. In yet another example, the hyperspectral image data may be used to detect false panels in vehicles, containers, furniture and the like by identifying differences within the thermal IR range of the hyperspectral image data, the differences indicated different temperatures of portions of the imaged object. Alternatively, the false panels may be detected from the hyperspectral image data based on inconsistent chemical differences of the false panels, such as mismatched paint, as compared to other panels or parts of the object being imaged.

Instead of having discreet wavelength steps such as the 1 nm or 10 nm, a tailored system may have one or more wavelength range(s) of interest and one or more control wavelength range(s). For example, a control wavelength may provide a known reference spectral intensity pattern, while the wavelengths of interest may provide information in addition to that obtained by comparison to the control wavelengths.

Figure 3:
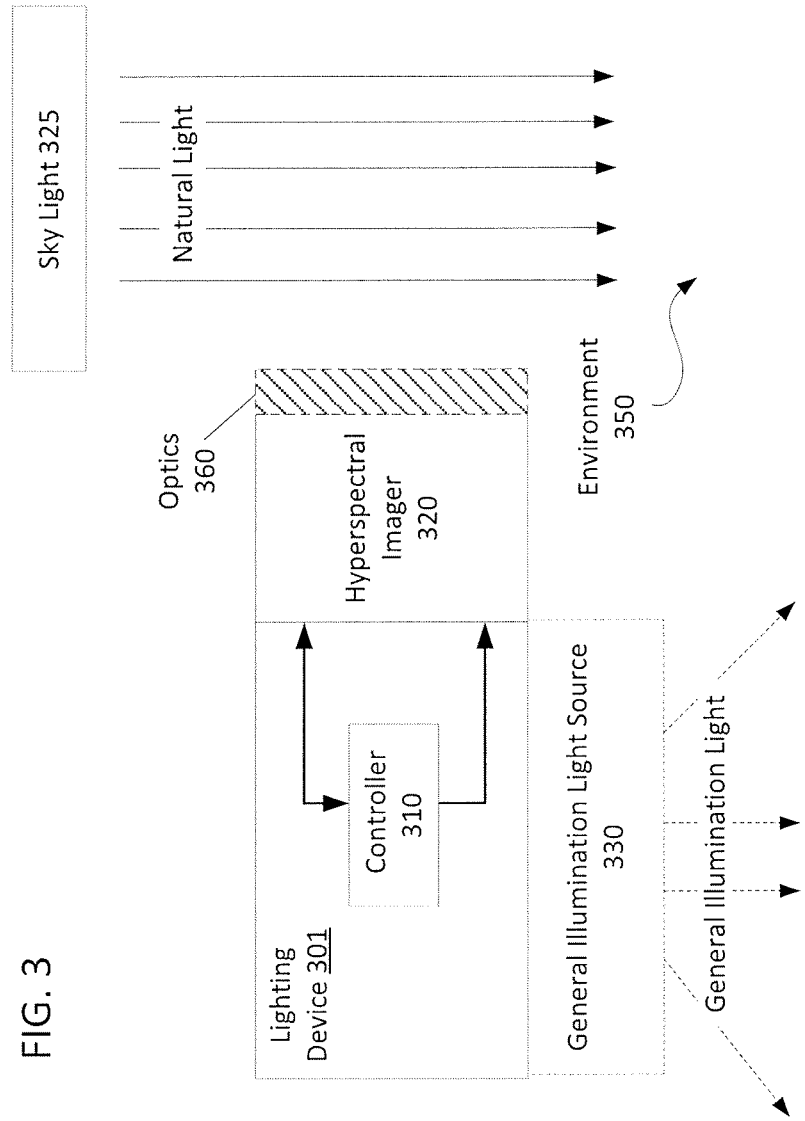
FIG. 3 provides a functional block diagram of an example of a device incorporating a hyperspectral imager for environmental monitoring and that augments passive lighting by providing light for general illumination.

FIG. 3 illustrates in a functional block diagram of an example of a device incorporating a hyperspectral imager for environmental monitoring and that augments passive lighting by providing light for general illumination. The device 301 includes a controller 310, a hyperspectral imager 320 and a general illumination light source 330. The device 301 may optionally include a hyperspectral imager optic 360 coupled to the hyperspectral imager 320.

The hyperspectral imager optic 360 is configured to disperse light, whether natural light, artificial or a combination of both, incident on the optic 360 evenly toward the hyperspectral imager 320 thereby enabling the light to fill a field of view of the hyperspectral imager 320. For example, the hyperspectral imager optic 360 may be a lens having a shape, such as convex, concave or prismatic, or be a series of lenses that directs the natural light toward the hyperspectral imager 320 so that the hyperspectral imager 320 receives enough light to output detection signals suitable for analysis by the controller 310. The optics 360 may be configured to disperse the light, in the environment 350 on the hyperspectral imager 320. However, the optics 360 may be unneeded depending upon the environment 35 being monitored. For example, a focusing optic 360 may not be desired, if the environment 350 is a large open space and the hyperspectral imager 320 has a wide field of view. Alternatively, if the environment is a smaller space, such as a food preparation table, a buffet table, an operating room or the like, then it may be desirable to include the optics 360 with the lighting device 301.

The light source 330 may be an array of light emitting diodes or the like that are configured to output a predetermined total light output that is approximately 1,600 to 38,000 lumens of artificial light for illuminating the environment in which the lighting device 301 is located.

The controller 310 controls operation of the light source 330 and the hyperspectral imager 320. The controller 310 also analyzes the signals generated by the hyperspectral imager 320 in relation to spectral reference data stored in the memory to detect an environmental condition in the environment in which the lighting device 301 is located. For example, the controller 310 analyzes the signal received with respect to the spectral reference data to determine a chemical composition of the air in the environment. Based on the analysis, the controller 310 may detect an environmental condition in the environment in which the device is located. In response to the detected environmental condition, the controller 16 may be configured to output via the communication interface 303 a report of the detected environmental condition.

Similar to the controller 204 in lighting device 102 of FIG. 2, the controller 310 of lighting device 301 is coupled to the light source 330 and the hyperspectral imager 320. The controller 310 controls the respective components in a manner similar to that described with reference to FIG. 2. And, similar to the functions performed by the controller, the hyperspectral imager and a measurement volume of FIGS. 1-2 as described above, the controller 310, the hyperspectral imager 320 and a general illumination light source 330 perform similar functions and output similar results. A reader should refer to the above descriptions of these elements for details of the similar function as such details will not be repeated for ease of discussion.

In addition to the artificial light provided by the lighting device 301, passive lighting of the environment 350 by may be provided by natural light that enters the environment via the sky light 325, while the environment 350 may be illuminated by artificial light generated by the general illumination light source 330. The controller 310 may be configured to control the general illumination light source 330 to output light for general illumination of an area in the environment 350 in which the lighting device 301. The hyperspectral imager 320 may be configured to obtain three-dimensional spectral intensity distribution measurements of the environment in which the lighting device is located. The three-dimensional spectral intensity distribution measurements of the environment 350 are represented as hyperspectral three-dimensional image data. For example, the hyperspectral imager 320 may include specific spectral filters corresponding to the wavelengths of the light in the environment 350. The hyperspectral imager 320 generates signals of the hyperspectral three-dimensional image data. The controller 310, which includes a processor, receives the three-dimensional image data output from the hyperspectral imager 320, and selectively detects an environmental condition present in the environment based on an image analysis of the hyperspectral image data. In a specific example, the controller 310 compares the hyperspectral image data obtained by the hyperspectral imager to the reference spectral intensity patterns stored in the memory. Based on a result of the comparison, the processor of the controller 310 detects a substance that is present in the environment 350 in which the lighting device 301 is located. The controller 310 generates a report based on an analysis of the signals generated by the hyperspectral imager 320. The controller 310 may output the report to an external device coupled to a communication network for evaluation and/or other actions.

In response to the detection report indicating an unsafe environmental condition, e.g., smoke or unsafe levels of CO, the controller detecting the unsafe environmental condition may transmit the detection report or an indication of the unsafe condition to an external device. Alternatively or in addition, in response to the detection of an unsafe environmental condition, the controller 510 may output control signals to the light source 330 causing the light source 330 to emit flashes of light or blink to indicate the existence of an unsafe environmental condition to occupants of the environment 350.

As mentioned in an earlier example, a report may be a list of values that correspond to an identifier of the detected substance. The report may include an identifier of the substance and/or additional information relevant to detected substance. For example, the report may have one or more identifiers associated with one or more of a bacteria, a virus, smoke, carbon monoxide, carbon dioxide, natural gas, or the like. This list is not exhaustive but it is envisioned that the list of identifiers may include all substances detectable by the hyperspectral imager 320.

However, the image data provided by a hyperspectral imager may also be analyzed to determine the chemical compositions, biologic materials and environmental conditions related to the environment in which the lighting device is located. For example, hyperspectral image data may be analyzed to detect the condition/health of an animal, human or a plant. Accordingly, the spectral reference data including the reference spectral intensity pattern and the identifier may be related to different conditions associated with stress and/or well-being of an animal, human or plant.

Figure 4:
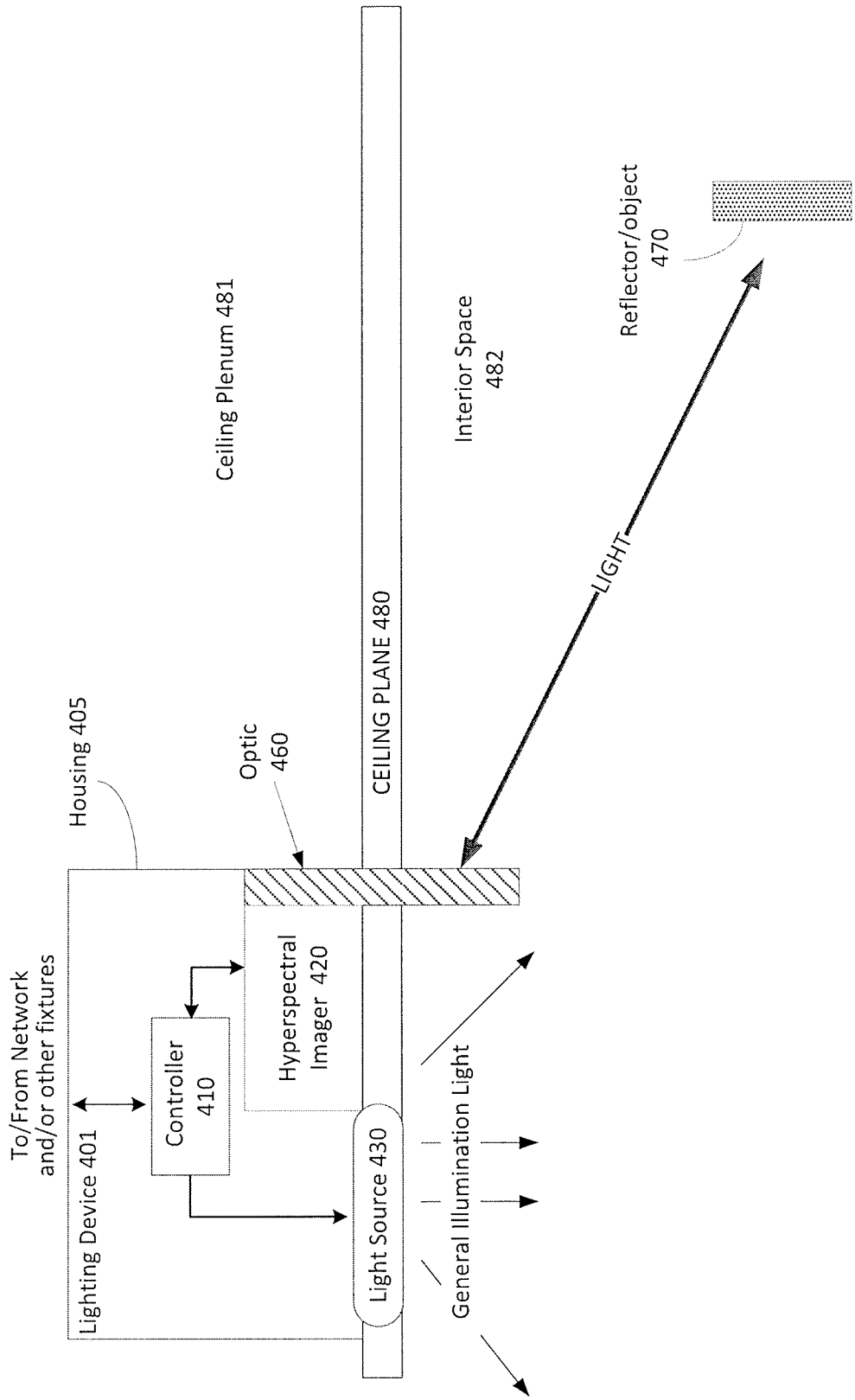
FIG. 4 provides a functional block diagram of an example of a device that provides general illumination and incorporates a hyperspectral imager.

FIG. 4 illustrates in a functional block diagram of an example of a device that provides general illumination and incorporates a hyperspectral imager. The example of FIG. 4 provides a device envisioned to be mountable in an indoor location that would benefit from environmental condition analysis. In the illustrated configuration, the lighting device 401 includes a housing 405, a controller 410, a hyperspectral imager 420, a light source 430, a hyperspectral imager light source 435, hyperspectral imager optic 460 and a reflector/object 470. The controller 410 may be configured substantially as described above with reference to FIG. 2. As such, the controller 410 is coupled to the hyperspectral imager 420, the light source 430, the hyperspectral imager light source 435, and a communication network, such as 17 or 23 of FIG. 1.

In the example shown in FIG. 4, the lighting device 401 is positioned near the ceiling plane 480 with the housing 405 above the ceiling plane with substantial portion of the device 401 being located in the ceiling plenum 481. When in such a configuration, the hyperspectral imager optic 460 passes through the ceiling plane 480 into the interior space 482 so that light reflected from the reflector/object 470 is captured by the hyperspectral imager optic 460 and directed toward the hyperspectral imager 420. In addition, the hyperspectral imager optic 460 is also configured to direct light output from the hyperspectral imager light source 435 toward a reflector/object 470 located in the occupiable space 482.

Reflector/object 470 may be a reflective surface positioned in the environment in which the device is located to enable detection of an environmental condition in the air in the vicinity of the device 400. When the object 470 is configured as a reflector, it may be a retro-reflector, a reflective surface (e.g., a white surface, a polished metallic surface or the like). That surface having a known reflective characteristic could be used to more accurately calibrate the hyperspectral imager 420. Due to the known reference characteristics of the reflective surface, the processor will be able to recalibrate the analysis algorithms to compensate for changes in lighting, degradations in hardware or the like. The reflector 470 may be positioned such that the light output by the hyperspectral imager light source 435 may be aimed in the direction of the reflector 470. In addition, the reflector 470 may be configured to reflect light substantially in the direction of the hyperspectral imager 420 and/hyperspectral imager optic 460. For example, the reflector 470 may be in an occupiable space of the environment in which the device is installed, and positioned on a wall or other surface such that incident light from the hyperspectral imager light is directed toward the hyperspectral imager 420 and/hyperspectral imager optic 460. Alternatively, the reflector/object 470 may be an object, such as a food preparation area or surface, a hospital hallway, hospital room, a school locker room, office space or the like, and be located positioned such that the light output by the hyperspectral imager light source 435 may be aimed in the direction of the object 470. The object 470 may also have a surface treated to react to the presence of an environmental condition, such as a contaminant, such arsenic, $E.\ coli$, $Salmonella$; a gas (e.g., CO2), a chemical (e.g., an acid), or the like.

In general, the controller 410 controls the light source 430, the hyperspectral imager 420 and the hyperspectral imager light source 435. In the example of FIG. 4, since the hyperspectral imager 420 and hyperspectral imager light source 435 share the optic 460, the controller 410 may be configured to alternately output control signals causing the hyperspectral imager light source 435 to emit light through the optic 460 and output other control signals to the hyperspectral imager 420 to receive reflected light. The detection and analysis functions of the controller 410 are performed similar to the detection and analysis functions of controller 204 described above with reference to FIG. 2. In addition, the controller 410 performs an analysis of the detection signals generated by the hyperspectral imager 420, and outputs a report in a manner similar to the same functions performed by the controller 204. Based on the results of the analysis, the controller 410 may send a report to another device and/or to a remote device coupled to a communication network.

Figure 5:
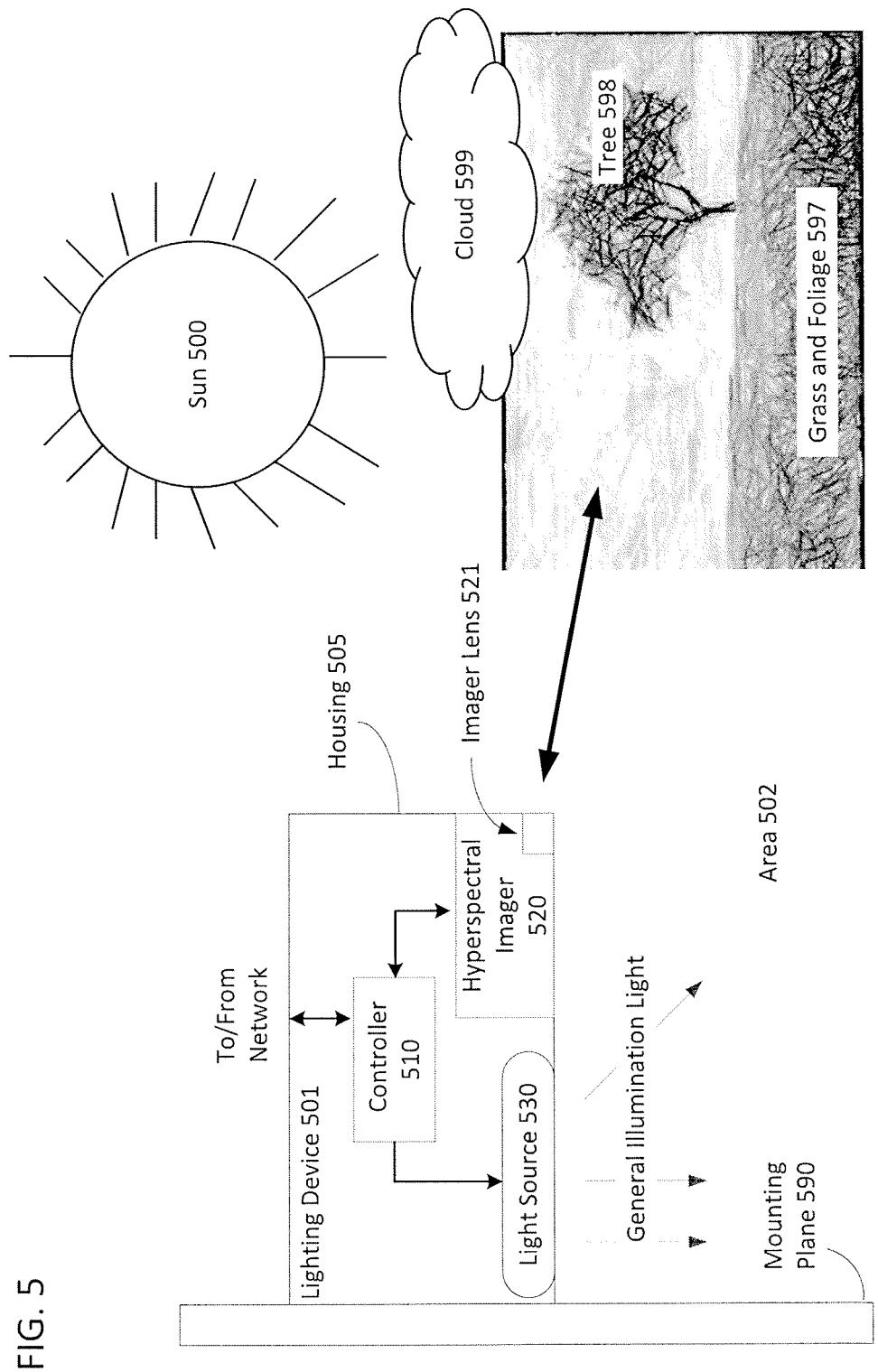
FIG. 5 illustrates another example of an implementation of a lighting device implemented to monitor atmospheric conditions, such as the chemical composition of clouds in the environment in the vicinity of the lighting device, using a hyperspectral imager.

FIG. 5 illustrates another example of an implementation of a lighting device implemented to analyze atmospheric and agricultural conditions, such as the chemical composition of clouds in the environment in the vicinity of the lighting device.

In the illustrated configuration, the device 501 includes a housing 505, a controller 510, a hyperspectral imager 520, a light source 530 and hyperspectral imager lens 521. The controller 510 may be configured substantially as described above with reference to FIG. 2. As such, the controller 510 is coupled to the hyperspectral imager 520, the light source 530, and a communication network, not shown in this example, but such as 17 or 23 of FIG. 1.

The device 501 may include a housing 505 that is configured to be mounted or connected to a surface, such as a wall, a post, a ceiling or the like, that is referred to as the mounting plane 590. The hyperspectral imager 520 captures ambient light in the area 502. The hyperspectral imager 520 provides the hyperspectral image data that the controller 510 analyzes. A processor of the controller 510 coupled to the lighting device is configured to provide multiple analyses simultaneously, or substantially simultaneously, of the cloud 599, the tree 598 and the grass and foliage 597. For example, the controller 510 may have stored in its memory (not shown) spectral reference data of various chemical compositions, biological materials, or environmental materials of a substance, such as a fungus or gas, that are indicative of harmful agricultural conditions or atmospheric states. The controller 510 may be configured to compare the spectral reference data stored in the memory to the hyperspectral image data as discussed in other examples.

The operation of the lighting device 501 and the functions performed by the respective components of the lighting device 501 operate in the same manner as the operations and functions described above with respect to FIGS. 2-4 above.

The lighting device 501 may be used in a number of different scenarios. For example, the lighting device 501 may be used to detect the air quality of a particular area 502, such as an area adjacent to a nuclear power plant, an industrial site, playground, a school yard or the like. For example, plant stress may be detected by using the "red" bandwidths to capture a fluorescence signature of the stress and use as a control the "green" non-fluorescing wavelengths. In some examples, specific reference spectral intensity patterns may be stored in the memory of lighting device 501.

Figure 6:
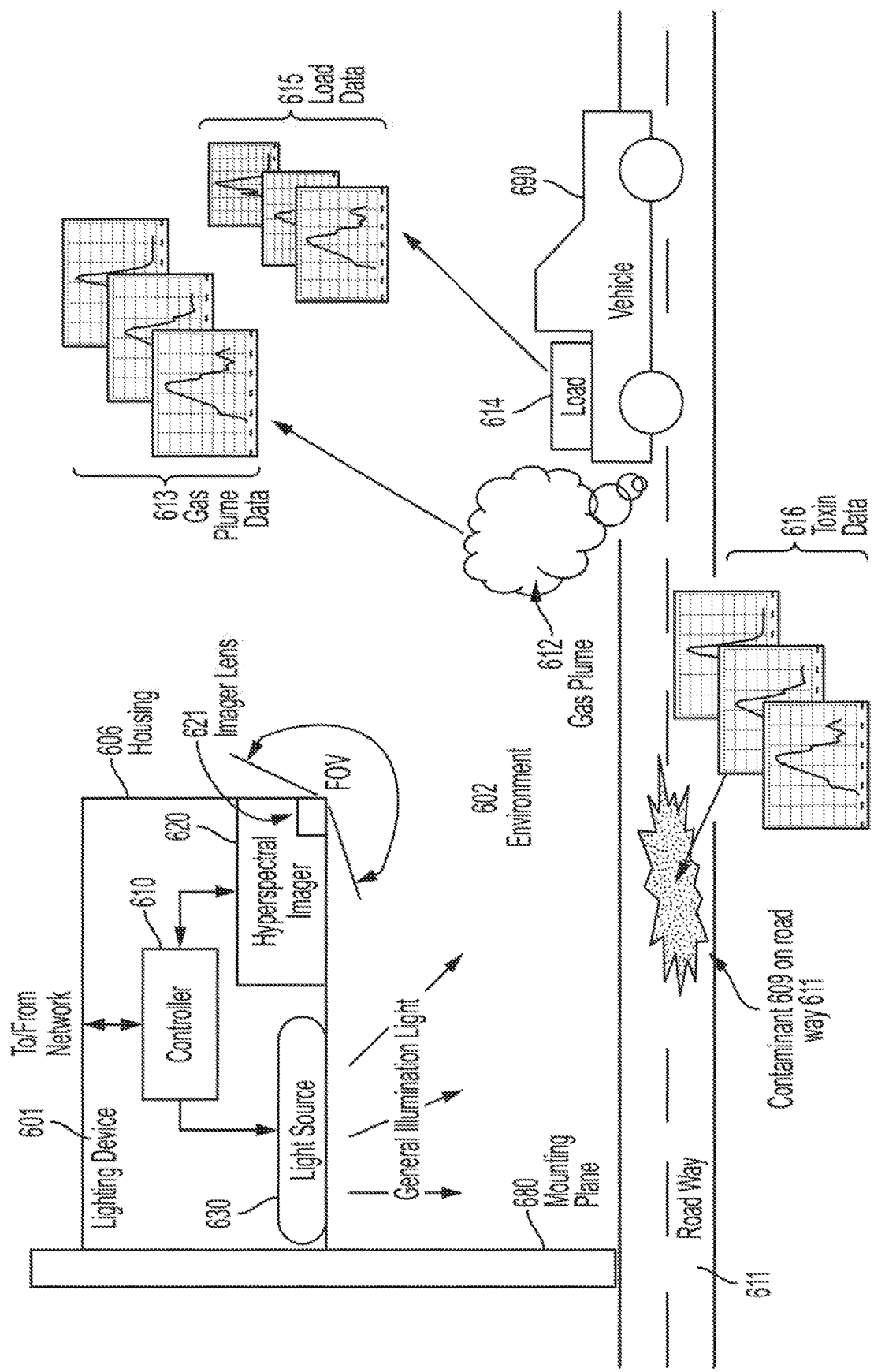
FIG. 6 illustrates a further example of a lighting device with a hyperspectral imager to analyze roadway conditions, such as the chemical composition of vehicle emissions or roadway contamination in the environment in the vicinity of the lighting device.

FIG. 6 illustrates a further example of an implementation of a lighting device implemented to analyze roadway conditions, such as the chemical composition of vehicle emissions or roadway contamination in the environment in the vicinity of the lighting device.

In the illustrated configuration, the lighting device 601 is mounted to a mounting plane 680. The device 601 includes a housing 606, a controller 610, a hyperspectral imager 620, a light source 630 and hyperspectral imager lens 621. The housing 606 may be configured to couple to the mounting plane 680. The mounting plane 680 may be a pole, a wall, roof or other structure. The controller 610 may be configured substantially as described above with reference to FIG. 2. As such, the controller 610 is coupled to the hyperspectral imager 520, the light source 530, and a data communication network, not shown in this example, but such as 17 or 23 of FIG. 1. The environment 602 includes roadway 611, contaminant 609, a vehicle 690 that is carrying a load 614 and emitting a gas plume 612.

The functions performed by the lighting device 601 are similar to the functions performed by lighting device 102 of FIG. 2. The example of FIG. 6 includes additional details related to the capabilities of the hyperspectral imager-equipped lighting device 601. For example, the imager lens 621 may be configured to enable the hyperspectral imager 620 to have a field of view that enables the capture of imagery of the roadway 611 and vehicles, such as vehicle 690 and the vehicle's load, such as 614, as well as the vehicle's emissions, such as gas plume 612.

In operation, the hyperspectral imager 620 is configured to obtain three-dimensional spectral intensity distribution measurements of the environment 602 in which the lighting device 601 is located. The three-dimensional spectral intensity distribution measurements of the environment are represented as hyperspectral three-dimensional image data such as gas plume data 613, load data 615, and/or toxin data 616. The spectral reference data may include a reference spectral intensity pattern that uniquely identifies an environmental condition based on a chemical composition, a biological material, or an environmental material of a substance, for comparison to the hyperspectral image data generated by the hyperspectral imager 620.

A processor of the controller 610 coupled to the general illumination light source 630 and the hyperspectral imager 620 is configured to receive the three-dimensional image data from the hyperspectral imager 620. The controller 610 processor executes programming instructions stored in memory (not shown in this example) and image processing techniques to selectively detect an environmental condition present in the environment based on an image analysis of the hyperspectral image data. The controller 610 may simultaneously, or substantially simultaneously, analyze environmental conditions of the roadway 611 and vehicles, such as vehicle 690 and the vehicle's load, such as 614, as well as the vehicle's emissions, such as gas plume 612, or other environmental conditions captured in the hyperspectral image data.

The lighting device 601 may, for example, determine whether the contaminant 609 on the road way 611 is a toxin, and whether hazardous material services need to be alerted. Simultaneously, or substantially simultaneously, as analyzing the contaminant 609, the lighting device may determine whether the gas plume 612 has a percentage of pollutants that exceeds a governmental threshold of pollutants, and determine a composition (e.g., chemical or biological) of the load 614 in the vehicle 690.

Figure 7:
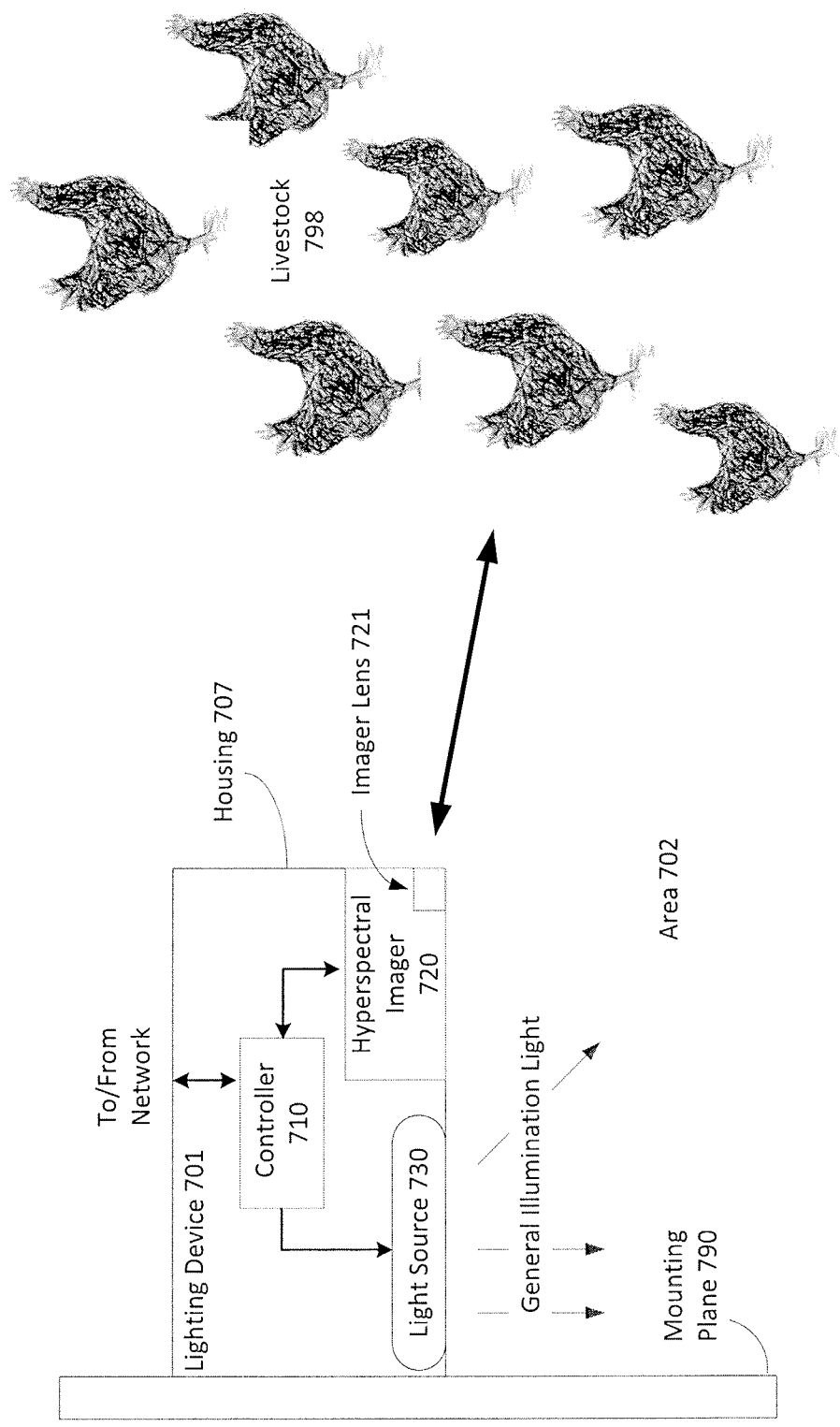
FIG. 7 illustrates an example of an implementation of a lighting device with a hyperspectral imager for monitoring livestock.

FIG. 7 illustrates another example of an implementation of a lighting device implemented to analyze atmospheric and agricultural conditions, such as the chemical composition of clouds in the environment in the vicinity of the lighting device.

In the illustrated configuration, the device 701 includes a housing 707, a controller 710, a hyperspectral imager 720, a light source 730 and hyperspectral imager lens 721. The controller 710 may be configured substantially as described above with reference to FIG. 2. As such, the controller 710 is coupled to the hyperspectral imager 720, the light source 730, and a communication network, not shown in this example, but such as 17 or 23 of FIG. 1.

The device 701 may include a housing 707 that is configured to be mounted or connected to a surface, such as a wall, a post, a ceiling or the like, that is referred to as the mounting plane 790. The hyperspectral imager 720 captures ambient light in the area 702. The hyperspectral imager 720 provides the hyperspectral image data that the controller 710 analyzes. A processor of the controller 710 is configured to provide multiple analyses simultaneously, or substantially simultaneously, of the livestock, in this case, poultry 798. For example, the controller 710 may have stored in its memory, such as memory 219 of FIG. 2, spectral reference data of various chemical compositions, biological materials, or environmental materials of a substance, such as a fungus, temperature level or gas, that are indicative of harmful veterinary conditions or environmental states. The controller 710 may be configured to compare the spectral reference data stored in the memory to the hyperspectral image data as discussed in other examples.

The operation of the lighting device 701 and the functions performed by the respective components of the lighting device 701 operate in the same manner as the operations and functions described above with respect to FIGS. 2-4 above.

The lighting device 701 may be used in a number of different scenarios. For example, the lighting device 701 may be used to detect the health of livestock in a particular area 702, such as a poultry farm, a fishery, a stockyard, live animal shipping containers. or the like. In this example, the specific reference spectral intensity patterns stored in the memory, such as memory 216, 218 or 219 of FIG. 2, of lighting device 701 may be directed toward distributions associated with ailments of the particular livestock (e.g., Hereford cows, pigs, salmon or the like) being monitored, or a class of livestock (e.g., fish, cattle, sheep or the like) being monitored. Livestock 798 may also be, for example, horses in a stable, cats or dogs in a kennel setting, aquatic mammals or fish in an aquarium setting, or the like.

Aspects of methods of detecting, via a lighting device, spectral imagery data and analyzing the spectral illumination data by the devices described above relative to FIGS. 1-7 outlined above may be embodied in programming, e.g., in the form of software, firmware, or microcode executable by a processor in a controller of a lighting device, a portable handheld device, a user computer system, a server computer or other programmable device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into platform such as one of the controllers of FIGS. 2-7. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible or non-transitory storage medium, a carrier wave medium or physical transmission medium. Non-volatile storage media include, for example, read-only memory (ROM) or flash memory in a controller of a lighting device. Other examples of non-volatile memory includes optical or magnetic disks, such as any of the storage hardware in any computer(s), portable user devices or the like, such as may be used to implement the server computer 29, the personal computer 27, the mobile device 25 or controllers 102, 204, etc. shown in the drawings. Volatile storage media include dynamic memory, such as main memory of such a controller, a computer or other hardware platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge (the preceding examples of computer-readable media being "non-transitory" and "tangible" storage media), a carrier wave transporting data or instructions, cables or links transporting such a carrier wave, or any other medium from which a computer can read programming code and/or data. Many of these forms of computer readable media may be involved in carrying data and/or one or more sequences of one or more instructions to a processor for execution.

Program instructions may comprise a software or firmware implementation encoded in any desired language. Programming instructions, when embodied in a machine readable medium accessible to a processor of a computer system or device, render a computer system or a device into a special-purpose machine that is customized to perform the operations specified in the program instructions.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A lighting device, comprising:
a housing;
a light source within the housing and configured to output artificial or natural light for general illumination; and
a hyperspectral imager, coupled to the housing, configured to detect the light and generate hyperspectral image data from intensities in a spectral band of one of ultraviolet, visible, or infrared range of wavelengths of the detected light, wherein the light source and the hyperspectral imager are integrated components of the lighting device, the hyperspectral imager comprising:
a memory storing spectral reference data and program instructions for processing and analyzing the hyperspectral image data; and
a processor coupled to the memory, the light source and the hyperspectral imager, wherein the processor, when executing the stored program instructions is configured to perform functions, including functions to:
analyze the hyperspectral image data generated by the hyperspectral imager using image processing analysis techniques in relation to the spectral reference data;
based on the results of the image analysis of the hyperspectral image data, detect an environmental condition in the environment in which the lighting device is located; and
control operation of the light source.

2. The lighting device of claim 1, further comprising a communication interface coupled to the hyperspectral imager and a data communication network.

3. The lighting device of claim 1, wherein the spectral reference data includes a reference spectral intensity pattern that uniquely identifies an environmental condition based on a chemical composition, a biological material, or an environmental material of a substance, for comparison to the hyperspectral image data generated by the hyperspectral imager.

4. The lighting device of claim 3, wherein:
the memory stores the reference spectral intensity pattern uniquely identifying a different chemical composition, a different biological material, or a different environmental material of the substance; and
the processor is further configured to:
receive via a communication interface updated spectral reference data, wherein the updated spectral reference data changes the reference spectral intensity pattern.

5. The lighting device of claim 1, wherein the processor is further configured to perform a function to:
in response to a predetermined output report, adjust an output of the light source.

6. The lighting device of claim 1, wherein the spectral reference data includes:
a reference spectral intensity pattern directed to a particular substance having a specific chemical composition, a specific biological material, or a specific environmental material identifiable from the generated hyperspectral image data, and
an identifier corresponding to the specific chemical composition, the biological material or the environmental material of the particular substance.

7. The lighting device of claim 5, wherein the processor is further configured to perform functions to:
receive additional spectral reference data via a communication interface, wherein the additional spectral reference data includes a reference spectral intensity pattern related to a substance associated with the environmental condition present in the hyperspectral image data;
store the received, additional spectral reference data in the memory with previously stored spectral reference data;
access the stored additional spectral reference data and previously stored spectral reference data in the memory, and
based on an analysis of the hyperspectral image data generated by the hyperspectral imager in relation to the reference spectral intensity pattern of the stored data file, output one or more identifiers associated with the substance, wherein the identifier is included in an environmental condition report.

8. The lighting device of claim 5, wherein when executing the function to analyze the received image data includes a function to:
compare the hyperspectral image data generated by the hyperspectral imager to the reference spectral intensity pattern in the spectral reference data; and
based on the results of the comparison, identify one or more of identifiers in the spectral reference data that correspond to the hyperspectral image data for inclusion in an outputted report of the detected environmental condition.

9. The lighting device of claim 1, further comprising:
a wireless transceiver coupled to a communication interface and to a wireless network, wherein the wireless transceiver is configured to
transmit an information signal, based on the results of the image analysis of the hyperspectral image data, to devices within a premises of the lighting device to control an operation of the devices.

10. The lighting device of claim 9, wherein the wireless transceiver is further configured to transmit a report of the detected environmental condition output by the processor to a device external to the environment in which the lighting device is located.

11. The lighting device of claim 1, further comprising:
an imager optic coupled to the hyperspectral imager, wherein the imager optic is configured to evenly disperse light incident on the optic toward the hyperspectral imager.

12. The lighting device of claim 11, wherein the imager optic is further configured to:
pass through a ceiling plane into an occupiable space in the vicinity of the environment in which the device is installed.

13. The lighting device of claim 11, wherein the imager optic is further configured to:
direct light reflected from a surface toward the hyperspectral imager, wherein the surface is in an occupiable space of the environment in which the device is located.

14. The lighting device of claim 11, wherein the imager optic is further configured to:
   direct light reflected from a reflector toward the hyperspectral imager, wherein the reflector is in an occupiable space of the environment in which the device is installed.

15. The lighting device of claim 11, wherein the imager optic is further configured to:
   direct light from a scene containing a mobile source toward the hyperspectral imager, wherein the mobile source is moving through the environment in which the device is installed.

16. The lighting device of claim 11, wherein the imager optic is further configured to:
   direct ambient sunlight from the environment in which the device is located toward the hyperspectral imager.

17. The lighting device of claim 1, further comprising a controller configured as a processor to provide control functions for the lighting device.

18. The lighting device of claim 17, wherein the controller controls building management products in accordance with the detection of the environmental condition.

19. The lighting device of claim 18, wherein the building management product is a heating, ventilation and air conditioning (HVAC) control system.

20. The lighting device of claim 1, wherein the hyperspectral image data includes sensed data from a sensor configured to detect at least one of occupancy, ambient light, humidity (H2O), carbon monoxide (CO), carbon dioxide (CO2), smoke, temperature, natural gas, or biological material.

21. A lighting device, comprising:
   a housing;
   a light source within the housing and configured to output artificial or natural light for general illumination; and
   a hyperspectral imager, coupled to the housing, configured to detect the light and generate hyperspectral image data from intensities of one or more subsets of a continuous spectrum of wavelengths of the detected light, wherein the light source and the hyperspectral imager are integrated components of the lighting device, the hyperspectral imager comprising:
      a memory storing spectral reference data and program instructions for processing and analyzing the hyperspectral image data; and
      a processor coupled to the memory, the light source and the hyperspectral imager, wherein the processor, when executing the stored program instructions is configured to perform functions, including functions to:
         analyze the hyperspectral image data generated by the hyperspectral imager using image processing analysis techniques in relation to the spectral reference data;
         based on the results of the image analysis of the hyperspectral image data, detect an environmental condition in the environment in which the lighting device is located; and
         control operation of the light source.

22. The lighting device of claim 21, further comprising a communication interface coupled to the hyperspectral imager and a data communication network.

23. The lighting device of claim 21, wherein the hyperspectral imager detects light in at least one subset of adjacent spectral bands of the continuous spectrum.

24. The lighting device of claim 23, wherein the hyperspectral imager detects light in at least one contiguous subset band of 750 nm to 850 nm of the continuous range of wavelengths.

25. The lighting device of claim 24, wherein a number of samples of wavelengths during the analyzing of the hyperspectral image data is 25-100 within the contiguous subset band.

26. The lighting device of claim 23, wherein the hyperspectral imager detects light in at least one contiguous subset range band of ≤100 nm to 100 μm.

27. The lighting device of claim 21, wherein the hyperspectral imager generates hyperspectral image data from intensities in a range of 470 nm-480 nm of wavelength of detected light.

28. The lighting device of claim 21, wherein the hyperspectral imager generates hyperspectral image data in a range of long-wave infrared wavelengths of the detected light.

* * * * *